United States Patent [19]

Noda et al.

[11] Patent Number: 5,600,621

[45] Date of Patent: Feb. 4, 1997

[54] LASER OUTPUT CONTROL DEVICE FOR AN OPTICAL INFORMATION RECORDING AND REPRODUCING APPARATUS

[75] Inventors: Kazuo Noda, Yokohama; Eiichi Nakamura, Sagamihara; Koichi Yamazaki, Sakado, all of Japan

[73] Assignee: Nippon Conlux Co., Ltd., Tokyo, Japan

[21] Appl. No.: 230,593

[22] Filed: Apr. 21, 1994

[30] Foreign Application Priority Data

Apr. 26, 1993 [JP] Japan ................................. 5-122028

[51] Int. Cl.$^6$ ..................................................... G11B 7/00
[52] U.S. Cl. ..................................................... 369/116; 369/54
[58] Field of Search ..................................... 369/112, 116, 369/54, 58, 121, 122

[56] References Cited

U.S. PATENT DOCUMENTS

| | | | |
|---|---|---|---|
| 5,023,858 | 6/1991 | Nakayama | 369/112 |
| 5,050,155 | 9/1991 | Kurata et al. | 369/112 |
| 5,146,449 | 9/1992 | Shimozawa | 369/116 X |
| 5,191,204 | 3/1993 | Dickson et al. | |
| 5,410,529 | 4/1995 | Kurata et al. | 369/116 X |

FOREIGN PATENT DOCUMENTS

| | | |
|---|---|---|
| 183569 | 6/1986 | European Pat. Off. . |
| 199565 | 10/1986 | European Pat. Off. . |
| 289304 | 11/1988 | European Pat. Off. . |
| 51-29821 | 3/1976 | Japan . |
| 52-23902 | 2/1977 | Japan . |
| 60-257584 | 12/1985 | Japan . |
| 247015 | 10/1990 | Japan . |
| 4330646 | 11/1992 | Japan . |
| 56260 | 1/1993 | Japan . |
| 5128569 | 5/1993 | Japan . |

OTHER PUBLICATIONS

European Search Report dated Aug. 24, 1994, Appl. No. EP 94 10 6095.

*Primary Examiner*—Georgia Y. Epps
*Assistant Examiner*—P. W. Huber
*Attorney, Agent, or Firm*—Loeb & Loeb LLP

[57] ABSTRACT

In a laser output control device for use in an optical information recording and reproducing apparatus which uses output light from a semiconductor laser device to record and reproduce information onto and from an optical information recording medium, a light receiving element is provided on the peripheral portion of a laser light emitting window formed in a housing of the semiconductor laser device. The peripheral component of forward radiated light of the laser light output from the semiconductor laser device is received by the light receiving element, so as to control the output power of the semiconductor laser device in accordance with output of the light receiving element corresponding to the received light.

9 Claims, 4 Drawing Sheets

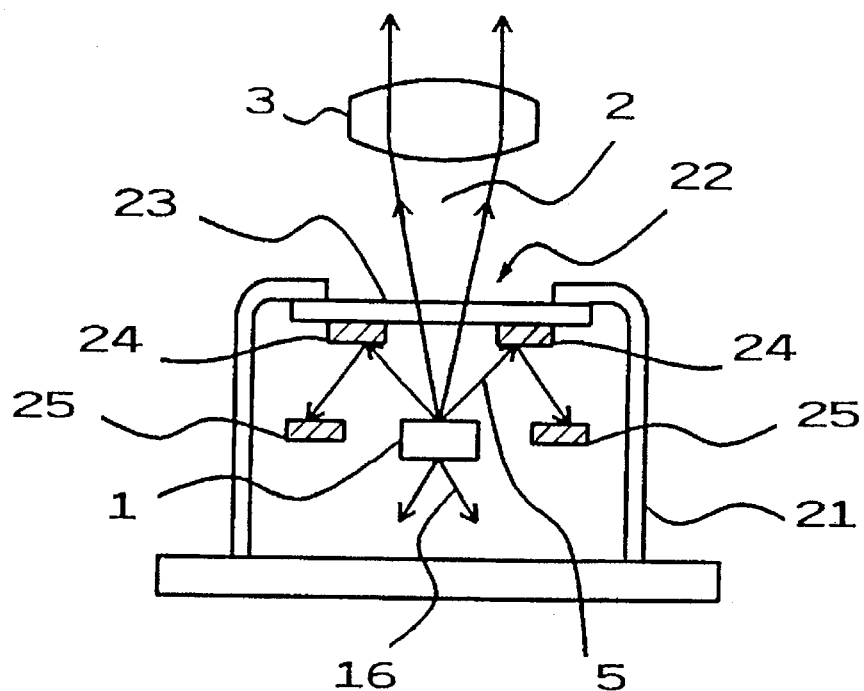
F I G. 5
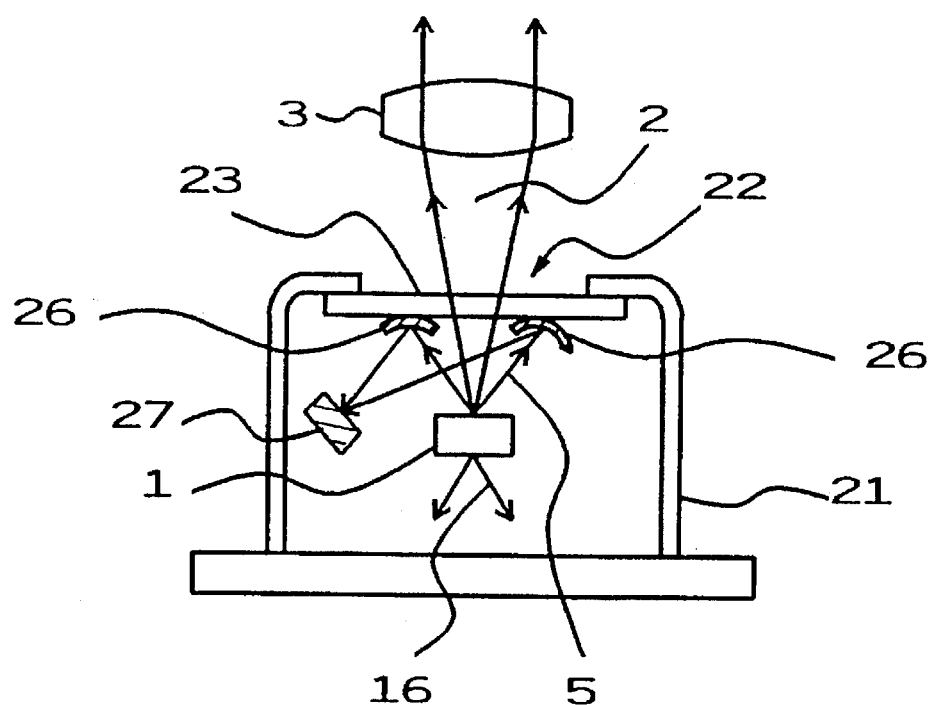
F I G. 6

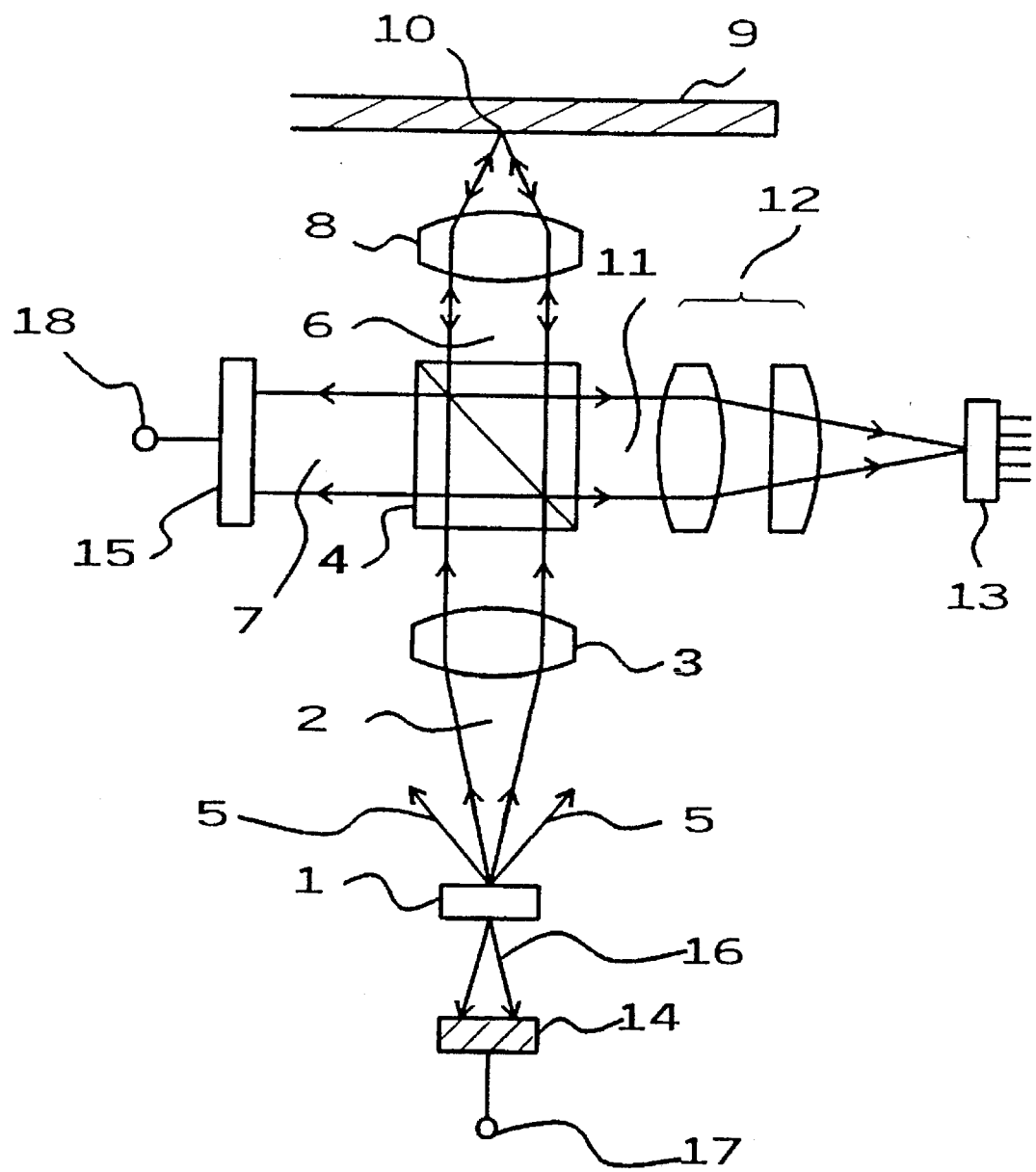
F I G. 7

LASER OUTPUT CONTROL DEVICE FOR AN OPTICAL INFORMATION RECORDING AND REPRODUCING APPARATUS

BACKGROUND OF THE INVENTION

The present invention generally relates to a laser output control device for use in an optical information recording and reproducing apparatus that records and reproduces information onto and from an optical information recording medium, and it more particularly relates to a device for controlling output power of a semiconductor laser.

Semiconductor lasers provide light outputs that vary with changes in temperature and in luminous energy. On the other hand optical information recording and reproducing apparatus provide automatic power control (hereinafter referred to as APC) of laser light utilized therein, because they require constant laser light output for recording and reproducing information in a uniform condition. Examples of the prior techniques relating to such automatic control of laser light output are disclosed in Japanese Patent Laid-open Publication Nos. SHO 52-23902 and 51-29821, Japanese Patent Publication Nos. HEI Nos. 2-47015 and 5-6260, and Japanese Patent Laid-open Publication No. HEI 4-330646.

For example, in an optical information recording and reproducing apparatus as shown in FIG. 7, the peripheral light component 5 of forward radiated light output from a semiconductor laser chip 1 is eliminated via a collimating lens 3, so that only the non-peripheral light component 2, i.e., the light component in and around the center of the forward radiated light, enters the collimating lens 3 to be converted into a collimated light beam, which then enters a beam splitter 4. The non-peripheral light component 2 is divided into transmitted light 6 and reflected light 7 by the beam splitter 4. The transmitted light 6 is converged by a converging lens 8 and directed onto an information recording medium 9 as a very minute laser light spot 10 to be utilized for effecting information recording or reproducing as needed. The reflected light 7 from the beam splitter 4 enters a light receiving element 15.

Reflected light from the information recording medium 9 goes back the same path that the transmitted light 6 took to reach the recording medium 9. The reflected light is converted via the converging lens 8 into a collimated beam, which is then directed to the beam splitter 4. Light transmitted through the beam splitter 4 is then directed onto the semiconductor chip 1 as return light, while light 11 reflected by the beam splitter 4 is received by a light receiving element 13 via light receiving lenses 12. Information signal, focus controlling signals and tracking controlling signals are derived from the light receiving element 13. The APC executes output control to maintain the laser light output at a constant value by means of a loop circuit configured such that a part of the light output from the semiconductor laser is received by the light receiving element 14 or 15, the light output from the element 14 or 15 is amplified by an output control circuit and fed back to the semiconductor laser chip.

To this end, the light receiving element 14 is designed to receive rearward radiated light 16 from the semiconductor laser chip 1 so as to provide the light output 17, and the light receiving element 15 is designed to receive the reflected light 7 from the beam splitter 4 to provide the light output 18.

In the illustrated embodiment, the rearward radiated light 16 output from the semiconductor laser chip 1 is derived via the light receiving element 14 that is mounted within a semiconductor laser housing (not shown). However, this prior arrangement presents a problem, because the forward and rearward radiated light outputs from the semiconductor laser chip 1 are not in complete correlation with each other, can not maintain the laser light output at a constant value and hence can not provide satisfactory APC operation.

Further, because the light receiving element 15 receives the reflected light 7 from the beam splitter 4, the element 15 greatly depends on the characteristics of the beam splitter 4. Thus, if, for example, a polarizing beam splitter is employed as the beam splitter 4 to reduce the transmitted light loss in the splitter and improve the optical efficiency of the optical system (usually, the beam splitter is combined with an ¼ wave plate so as to constitute a light isolator), the reflected light 7 will not exist, so that no output can not be obtained from the light receiving element 15.

Furthermore, the light receiving element 15 becomes large in size because it is designed to receive the reflected light 7 directly from the beam splitter 4, and thus the interelectrode capacity of the element 15 is increased, with the result that the response speed is objectionably decreased. This problem may be overcome by converging the light incident on the light receiving element 15 so as to reduce the size of element 15. To do this, it is necessary to provide a new light converging means, but provision of the new converging means is not compatible with the current demand for reducing the size and cost of the apparatus.

SUMMARY OF THE INVENTION

It is therefore an object of the present invent ion to provide a laser output control device for an optical information recording and reproducing apparatus which is capable of performing control to maintain the output of a semiconductor laser constant, by receiving peripheral light component of forward radiated light output from the semiconductor laser chip.

To achieve the above-mentioned object, an embodiment of the present invention provides a laser output control device for use in an optical information recording and reproducing apparatus which comprises a semiconductor laser device and an optical system for using the laser light generated by the semiconductor laser device to record and reproduce information onto and from an optical information recording medium. The laser output control device includes a light receiving element for receiving a peripheral light of forward radiated light of laser light generated by the semiconductor laser device and outputs an electric signal corresponding to the received peripheral light. It also includes a control section for controlling output power of the laser light generated by the semiconductor device, in accordance with the output of the light receiving element. In a preferred embodiment of the invention, the light receiving element is disposed on the periphery of a laser light emitting window that is provided in a housing of the semiconductor laser device.

The non-peripheral light component in and around the center of the forward radiated light from the semiconductor laser device passes through the laser light emitting window of a housing containing the laser device toward an optical information recording medium. On the other hand, the peripheral light component of the forward radiated light enters the light receiving element disposed on the periphery of the laser light emitting window, from which light output is obtained corresponding to the forward radiated light from the semiconductor laser device. Similarly, in such case where a reflection section may be provided on the periphery of the laser light emitting window so as to receive light reflected from the reflection section, light output is obtained which corresponds to the forward radiated light output from the semiconductor laser device. This light output is provided to an output control circuit of the semiconductor laser device, which controls the output power of the laser device.

With such arrangements, embodiments of the present invention can control the output power of the semiconductor laser device corresponding to the forward radiated light output from the laser device, and thus the embodiments of the present invention can achieve advantages that the output power control provided by the embodiments of the present invention is far more effective than the correlation-lacking feedback control provided by the prior technique using rearward radiated light, and any sort of beam splitter can be employed. Further, because a smaller-size light receiving element can be utilized, the response speed of the element never decreases and thus it is not necessary to provide any means for converging the light incident on the light receiving element in order to prevent a response speed decrease, with the result that the output power control and APC response characteristics of the laser light can be highly enhanced, limitations on the device design can be eliminated, and the size and cost of the device can be substantially reduce.

BRIEF DESCRIPTION OF THE INVENTION

The preferred embodiments of the present invention will be described in detail below with reference to the accompanying drawings.

FIG. 5 is a schematic side elevational view illustrating an example structure of a semiconductor laser section in another embodiment of the invention;

FIG. 6 is a schematic side elevational view illustrating an example structure of a semiconductor laser section in still another embodiment of the invention; and FIG. 7 is a schematic side elevational view illustrating the structure of an optical system employed in a prior art optical information recording and reproduction device.

DETAILED DESCRIPTION OF THE INVENTION

Figure 1:
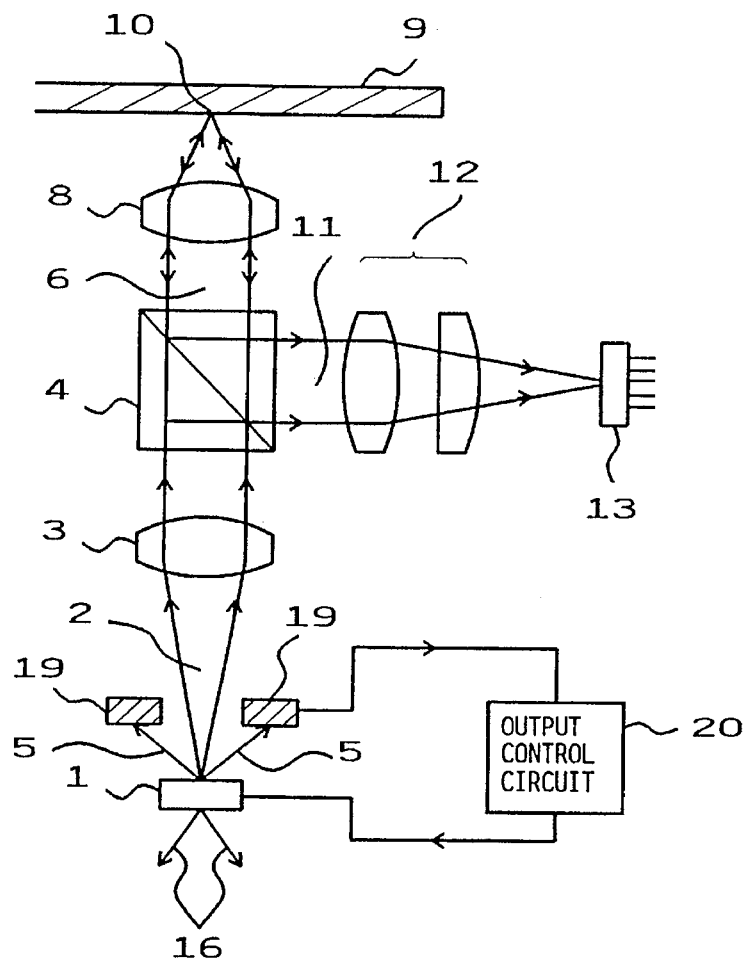
FIG. 1 is a schematic side elevational view of an optical system employed in one embodiment of the present invention.

Referring to FIG. 1 in which is shown an embodiment of the present invention, same reference characters as in FIG. 7 denote the same components as in FIG. 1. To first describe the optical configuration of the embodiment, the non-peripheral light component 2 in and around the center of forward radiated light output from a semiconductor laser chip 1 passes through a central aperture formed in a light receiving element 19 which is, for example, in the shape of a doughnut or ring, and then enters a collimating lens 3, from which the non-peripheral light component enters a beam splitter 4 in a collimated light beam. The beam splitter 4 may be a polarizing beam splitter through which all the incident light is allowed to pass. After that, in a similar manner to the above-mentioned FIG. 7, information signals, focus control signals and tracking control signals are derived from a light receiving element 13.

Figure 2:
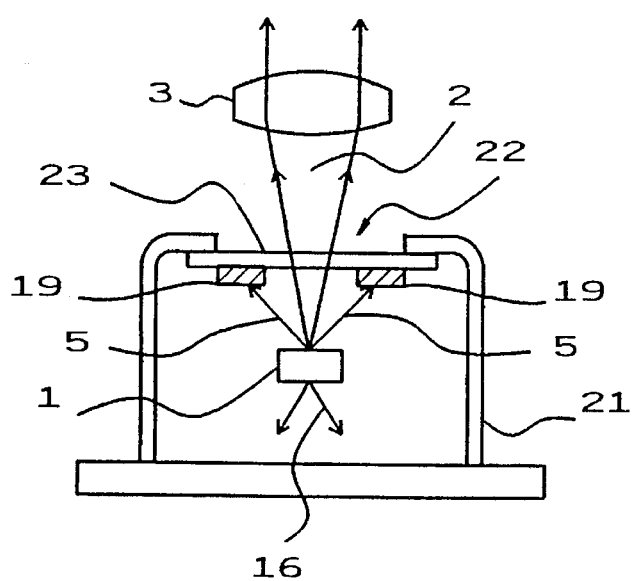
FIG. 2 is a schematic side elevational view illustrating an example structure of a semiconductor laser section in the embodiment of FIG. 1.

FIG. 2 shows in greater detail the essential parts of the embodiment of FIG. 1 and more particularly a detailed embodiment of a semiconductor laser section that accommodates the semiconductor laser chip 1. The semiconductor laser chip 1 is mounted within a housing 21, and the interior of the housing 21 is maintained airtight. The housing 21 has a laser light emitting window 22 which is covered with a transparent flat plate 23, and, for example, the doughnut-shaped or ring-shaped light receiving element 19 is preferably adhered to the transparent flat plate 19.

Figure 3:
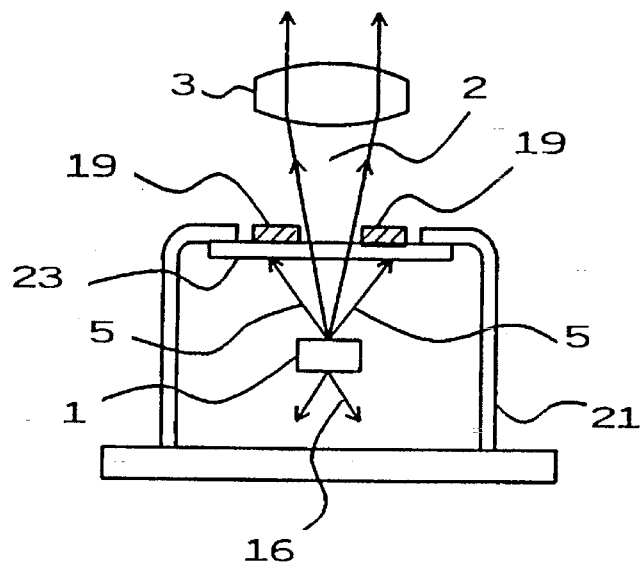
FIG. 3 is a schematic side elevational view illustrating another example of the structure of the semiconductor laser section in the embodiment of FIG. 1.

The doughnut-shaped light receiving element 19 is shown in FIG. 2 as adhered to the side of the transparent flat plate 23 facing the semiconductor laser chip 1; however, the light receiving element 19 may alternatively be adhered to the side of the plate 23 opposite to the laser chip 1 as shown in FIG. 3.

The novel structural feature of the present invention is that light receiving element 19 is disposed adjacent to, or on the periphery of the laser light emitting window 22 of housing 21 and the light output from the element 19 is fed back to a semiconductor laser output control circuit 20. Namely, in FIG. 2, the non-peripheral light component 2 in and around the center of the forward radiated light output from the semiconductor laser chip 1 enters the collimating lens 3 through the central aperture of the doughnut-shaped light receiving element 19, and the peripheral light component of the radiated light enters the light receiving element 19. In this case, the amount of non-peripheral light component 2 entering the collimating lens 3 will be dependent on the NA (numerical aperture) of the collimating lens 3. If, for instance, the NA of the collimating lens 3 is chosen to be 0.3 (NA=0.3) as is often the case with conventional optical information recording and reproducing systems, the light component within a 35° solid radiation angle of the forward radiated light output from the semiconductor laser chip 1 can enter the collimating lens 3. This accounts for about 60% of the forward radiated light, and the remaining 40% is contained in the peripheral light and is received by the light receiving element 19.

Figure 4A:
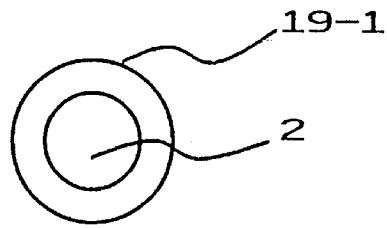
FIG. 4A is a schematic top plan view illustrating one example of the structure and arrangement of a light-receiving element in the embodiment of FIG. 1.
Figure 4B:
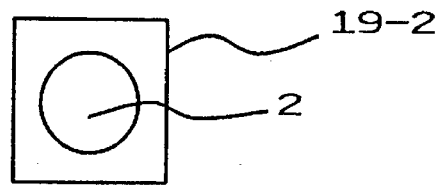
FIG. 4B is a schematic top plan view illustrating another example of the structure and arrangement of the light-receiving element.
Figure 4C:
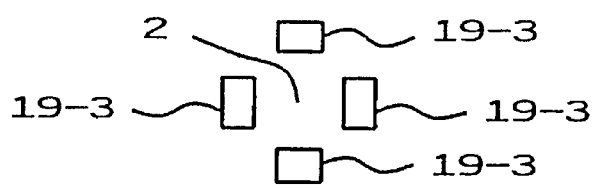
FIG. 4C is a schematic top plan view illustrating still another example of the structure and arrangement of the light-receiving element.
Figure 4D:
FIG. 4D is a schematic top plan view illustrating still another example of the structure and arrangement of the light-receiving element.

The light receiving element 19 may be of any shape as long as it can receive all or part of the peripheral light 5 of the forward radiated light. For instance, the light receiving element 19 may comprise a doughnut-shaped element 19-1 as shown in item FIG. 4A or a square or rectangular element 19-2 having a central aperture formed therein as shown in FIG. 4B, or it may comprise a predetermined plurality of separate elements 19-3 or 19-4 as shown in FIG. 4C or 4D.

FIG. 5 shows another embodiment of the present invention, in which a mirror 24 is disposed in place of the light receiving element 19 in the above-described embodiment, and light reflected from the mirror 24 is received by a light receiving element 25. In this embodiment, the mirror 24 and light receiving element 25 may be shaped like any of the elements 19-1 to 19-4 shown in FIGS. 4A to 4D.

FIG. 6 shows still another embodiment of the present invention, in which the mirror 24 is composed of a concave mirror 26 in addition to a plane mirror. The use of the concave mirror 26 can converge reflected light from the mirror 26 into a smaller area and thus can minimize the size of a light receiving element 27. Consequently, it is possible to minimize the interelectrode capacitance of the light receiving element 27, to thereby greatly increase its APC response speed. According to embodiments of the present invent ion as has been described so far, light output corresponding to the peripheral light component of forward radiated light from a semiconductor laser chip is obtained by a light receiving element and fed back to and controlled by a semiconductor laser output control circuit. Because of this feature, the embodiments of the present invention can achieve superior advantageous results that the output power control provided by the embodiments of the present invention is far more effective than the correlation-lacking feedback control provided by the prior technique using rearward radiated light, and any sort of beam splitter can be employed. Further, because a smaller-size light receiving element can be utilized, the response speed of the element never decreases and thus it is not necessary to provide any means for converging the light incident on the light receiving element in order to prevent such a response speed decrease, with the result that the output power control and APC response characteristics of the laser light can be highly enhanced, limitations on the device design can be eliminated, and the size and cost of the device can be substantially reduced.

What is claimed is:

1. An optical information recording and reproducing apparatus comprising:

a semiconductor laser device;

light receiving means for receiving peripheral light of forward radiated laser light generated by said semiconductor laser device and outputting an electric signal corresponding to the received peripheral light, wherein said light receiving means is disposed on a periphery of a laser light emitting window that is provided in a housing of said semiconductor laser device and, wherein said window comprises a transparent plate, and said light receiving means is disposed on the periphery of said window outside said housing;

control means for controlling output power of the laser light generated by said semiconductor laser device, in accordance with the electric signal output by said light receiving means; and an optical system for using the laser light generated by said semiconductor laser device to record and reproduce information onto and from an optical information recording medium.

2. An optical information recording and reproducing apparatus as defined in claim 1, wherein said light receiving means comprises a plurality of segments disposed on the periphery of said window that is provided for emitting the laser light generated by said semiconductor laser device.

3. An optical information recording and reproducing apparatus as defined in claim 1, wherein said control means performs automatic power control such that the output power of the laser light is maintained at a predetermined value.

4. An optical information recording and reproducing apparatus comprising:

a semiconductor laser device arranged for use as a light source for information recording and reproduction;

a housing for accommodating the semiconductor laser device and having a laser light emitting window section for allowing passage therethrough of laser light generated by the semiconductor laser device;

a light detection element including a light receiving element disposed adjacent the periphery of the laser light emitting window section, the light detection element receiving, by means of the light receiving element, peripheral light of forward radiated laser light which is generated by the semiconductor laser device and which passes through the window section, the light detection element being arranged to output an electrical signal representing an intensity of the received peripheral light;

a control circuit that, in accordance with the electrical signal output by the light detection element, automatically controls output power of the laser light generated by the semiconductor laser device to maintain the output power at a predetermined value; and an optical system including an optical path for allowing the forward radiated laser light generated by the semiconductor laser device and passing through the window section, to be irradiated onto an optical information recording medium, the optical system being arranged such that laser light reflected from the optical information recording medium is fed back along the optical path and branched towards a reading light receiving element via splitter means provided midway in the optical path wherein, the laser light emitting window section includes a window formed of a transparent plate and the light receiving element includes a light receiving element disposed on the outside of the housing at the periphery of the window formed by the transparent plate.

5. An optical information recording and reproducing apparatus as defined in claim 4, wherein the light receiving element is disposed in a ring-shaped configuration on the periphery of the window section.

6. An optical information recording and reproducing apparatus as defined in claim 4, wherein the light receiving element comprises a plurality of segments disposed on the periphery of the window section.

7. An optical information recording and reproducing apparatus comprising:

a semiconductor laser device;

light receiving element that receives peripheral light of forward radiated laser light generated by the semiconductor laser device and outputting an electric signal corresponding to the received peripheral light, wherein the light receiving element is disposed on a periphery of a laser light emitting window that is provided in a housing of the semiconductor laser device and, wherein the light receiving element is disposed on the periphery of the window outside the housing;

a control circuit that controls output power of the laser light generated by the semiconductor laser device, in accordance with the electric signal output by the light receiving element; and an optical system for using the laser light generated by the semiconductor laser device to record and reproduce information onto and from an optical information recording medium.

8. An optical information recording and reproducing apparatus as defined in claim 7, wherein the light receiving element includes a plurality of segments disposed on a periphery of a window that is provided for emitting the laser light generated by the semiconductor laser device.

9. An optical information recording and reproducing apparatus as defined in claim 7, wherein the control circuit performs automatic power control such that the output power of the laser light is maintained at a predetermined value.

* * * * *